United States Patent Office 3,361,577
Patented Jan. 2, 1968

3,361,577
PROCESS OF TREATING SYNTHETIC SAUSAGE CASING SO THAT RED COLOR WILL DEVELOP ON THE SURFACE OF A MEAT EMULSION STUFFED THEREIN
Selwyn Simon, North Brook, and Francis W. Tauber, Chicago, Ill., assignors to Union Carbide Corporation, a corporation of New York
No Drawing. Filed Feb. 9, 1966, Ser. No. 526,064
6 Claims. (Cl. 99—176)

This is a continuation-in-part of copending application Ser. No. 208,615 filed July 9, 1962, now abandoned.

This invention relates to a method of producing sausages and to the synthetic food casings used therewith. More particularly, this invention relates to synthetic food casings which are treated with an edible reducing agent such that a uniform red cured meat color is imparted to the surface of a raw meat emulsion encased and processed therein.

Consumers of cooked, cured meat emulsion products associate a bright pink or red color as being a normal surface characteristic for products such as frankfurters, bolognas, salamis, vienna sausages and the like. This color is usually developed during cooking, curing, or processing of the meat emulsions, the emulsion comprising comminuted or chopped meat, meat products, spices and curing agents. Meat emulsions, when subjected to smoke house processing, are normally adequately cooked with regard to edibility and texture within standard conditions of time and temperature for such emulsions. However, the thusly cooked and cured product generally does not develop an acceptable red cured meat color on its surface during this processing period. Usually, the product must be subjected to further processing before the desired red cured meat color is obtained. This longer processing time increases the cost of manufacture and also results in a significant loss of weight of the product.

Another problem frequently encountered in smoke house processing of encased meat emulsions occurs when linked encased meat emulsions are suspended on aluminum rods, or "smoke sticks," resulting in the formation of a greenish surface discoloration on the part of the linked encased meat emulsion resting on the aluminum rod surfaces. Such discoloration does not necessarily indicate inedibility of the cooked meat product but is nevertheless regarded by the average consumer with suspicion and often results in rejection of the product.

What causes such discoloration is presently not fully understood. It has been suggested that the presence of trace amounts of metals, such as copper, in the aluminum rod could conceivably promote oxidation and conversion of denatured protein pigment material in the meat to greenish colored products. Another hypothesis suggests that bacteria in the meat emulsion oxidizes the denatured protein pigments to greenish products.

It is an object of the present invention to provide a synthetic food casing which is capable of imparting a red cured meat color to the surface of a raw meat emulsion encased and processed therein in less time than has been heretofore realized by treating the synthetic food casing with an edible reducing agent prior to stuffing and processing a raw meat emulsion therein.

This and further objects of the present invention will become apparent from the ensuing discussion.

It has now been found that a red cured meat color can be imparted to the surface of a meat emulsion which has been stuffed, at ambient temperatures, into a synthetic food casing by treating the synthetic food casing with a suitable, edible reducing agent before stuffing the raw meat emulsion therein and then subjecting the thusly encased meat emulsion to further processing, cooking and curing. Surprisingly, a red meat color is imparted to the surface of the raw meat emulsion immediately upon stuffing of the raw meat emulsion in the treated food casing prior to any subsequent cooking and curing of the thusly encased raw meat emulsion.

It has also been found that the desired red cured meat color is further developed and retained on the surface of the encased meat emulsion during subsequent processing, curing and cooking thereof as well as during extended storage periods of the encased meat product.

Although it is not intended to limit this invention to any particular theory, it is believed that the reducing agent in the casing reacts with nitrite at the surface of the encased meat emulsion to give a high concentration of nitric oxide and a resulting high conversion of myoglobin to nitrosomyoglobin, the cured meat pigment. The reducing agent is in much greater concentration than the nitrite at the meat surface and the excess reducing agent stabilizes the nitrosomyoglobin against degradation and the formation of greenish discolorations.

As employed throughout this specification and in the appended claims, it should be understood that the term "synthetic food casing" refers to those food casings obtained from materials which include, but which are not restricted to, collagen, cellulose, regenerated cellulose, and the like. It should also be understood that these synthetic food casings must be hydrophilic to allow the raw meat emulsion to be processed to obtain a cooked cured meat product. Hence, the synthetic food casings are used in the present invention as containers or molds for the processing of the raw meat emulsions encased therein.

The term "curing," as employed throughout this specification and in the appended claims, should be understood to refer to conventional processes wherein food products are transformed from a raw state to an edible state, usually by subjecting the food product to heat. Similarly, the term "cooking," as used throughout this specification and in the appended claims, refers to conventional processes wherein the internal temperature of a raw or cured food product is raised to acceptable pasteurization temperatures, generally to about 137° F.

It should further be understood that the terms "red meat color" and "red cured meat color" are terms employed by those skilled in the art to generally distinguish and identify meat emulsion products which are consumer acceptable. For example, the term "red meat color" is generally used to identify meat emulsion products which exhibit a bright pink to bright red color while the term "red cured meat color" generally identifies meat emulsion products which have been cured and/or cooked and exhibit a bright pink to bright red or deep red color and sometimes also have a brownish hue. The intensity of the brownish hue, when present, is somewhat dependent upon the beef content of the meat emulsion product; the greater the beef content, the lower the brownish hue and vice versa. Use of the terms "red meat color" and "red cured meat color" throughout this application and in the appended claims should also be understood as falling within the recognized uses of these terms as employed by those skilled in the art.

In the practice of the present invention, a synthetic food casing, such as a cellulosic food casing, is treated with a suitable edible reducing agent prior to stuffing a raw meat emulsion therein. Among the edible reducing agents which can be employed are compounds selected from the group consisting of 1-ascorbic acid, isoascorbic acid, edible metal salts of these acids, such as sodium ascorbate and sodium isoascorbate, esters of these acids, such as 1-ascorbyl laurate, 1-ascorbyl palmitate, 1-ascorbyl stearate, isoascorbyl myristate and isoascorbyl stearate, and mixtures thereof.

Although some of the edible reducing agents listed above have been employed in the wrapping and packaging of food products, their function has been generally restricted, either singly or with other chemicals, to that of preservatives or antioxidants to prevent rancidity or the growth of molds in previously cooked, porcessed or cured meats.

For the purposes of this invention, the method of treating a synthetic food casing with an edible reducing agent is readily accomplished by applying an aqueous solution of the agent to the casing. For example, when cellulosic casings are employed, they are usually plasticized with a water-soluble aliphatic polyhydric alcohol, such as glycerol, during their manufacture. Such a plasticizer can be readily included in the aqueous solution containing the reducing agent of the present invention so that the casing is plasticized with the polyhydric alcohol and the wall of the casing is simultaneously impregnated with the reducing agent in a single step. Preferably, when treating a cellulosic casing with the aqueous reducing agent solution, the casing is in the form of gel stock; that is, the cellulose in the casing, as formed by annular extrusion of viscose, has been regenerated and thoroughly water-washed to remove therefrom regeneration by-products but has not yet been dried. Gel stock cellulose casing, after being impregnated with the aqueous solution of an edible reducing agent, is then dried in an inflated state. The dried casing can then be shirred to form an otherwise conventional compact stick.

Alternatively, a dried glycerine plasticized cellulose casing can be treated with an aqueous solution of reducing agent followed by drying of the casing, or a previously glycerine plasticized gel stock cellulose casing can be similarly treated with the reducing agent. Such alternative methods, however, are not as economical as that of combining in one step the plasticization and impregnation of the edible reducing agent.

A cellulose casing, either as gel stock or as dried casing, can be satisfactorily impregnated with an effective amount of edible reducing agent to obtain the desired results by immersing the casing in an aqueous solution of the reducing agent at room temperatures for a period of time sufficient to insure diffusion of the solution through and into the casing wall to the interior wall surface which will be in contact with a raw meat emulsion stuffed therein. An immersion time of about 2 to 3 minutes usually suffices to obtain complete impregnation of the edible reducing agent in the casing.

The casing can also be satisfactorily impregnated by introducing the aqueous solution of reducing agent directly into the interior of a continuous length of casing, as a liquid column in a spaced portion of such casing, as it is being transported continuously from the last washing vat to the drier. Excess solution adhering to the casing walls is removed by passing the casing between squeeze rollers and/or wipers before it enters the drier. As pointed out above, the casing can also be simultaneously plasticized during this operation by including an edible polyhydric alcohol plasticizer in the aqueous solution of reducing agent.

Only a small amount of edible reducing agent is required in the casing to impart the surface red cured meat color developing property. For example, ascorbic acid, or its equivalent, in amounts as low as 0.05% by weight of the dried, plasticized casing will yield satisfactory surface color development. Preferably, the reducing agent is present in an amount of between about 0.08% to 1.0% by weight in the dried casing. Amounts larger than 1.0 weight percent of ascorbic acid, or its equivalent, can be used but have not been found to result in any further significant improvement as regards the speed of color development or color intensity.

In the practice of the present invention, an edible stabilizer can also be admixed in the aqueous reducing agent solution used to impregnate the casings. Incorporation of an edible stabilizer assists in retarding oxidation of the reducing agent thereby permitting the effectiveness of the reducing agent in the synthetic food casing to be retained for longer periods during storage and shipment.

Suitable oxidation inhibitors include the saturated aliphatic hydroxy acids such as citric acid, d-tartaric acid and their edible salts, as exemplified by sodium citrate. An oxidation inhibitor employed to stabilize a reducing agent, such as ascorbic acid and the like, can be present in amounts of up to 10 times the weight of the reducing agent without impairing the latter's effect in promoting color development.

The following examples are set forth as being illustrative of the manner in which the present invention can be accomplished and are not intended, in any way, to be limitative thereof.

In each of the following examples, 400 feet of a non-plasticized regenerated cellulosic casing (gel stock) was treated with an aqueous solution of an edible ascorbate reducing agent by soaking the casing in 10 liters of aqueous solution made up in the concentrations indicated. The casing was soaked in the solution for 30 minutes at about 26° C. Thereafter, the treated casing was passed between a pair of squeeze rollers and wiper rods to remove as much of the excess solution as possible. The casing was then dried by passing the casing, in the inflated state, through a hot air drier maintained at a temperature of about 100–105° C. The casing was then shirred and humidified in a conventional manner known to those skilled in the art. The amount of ascorbic acid present in the dried casing was determined by the method of Schmall, Pifer and Wollish, Anal. Chem., 25, 1486 (1953).

Unless otherwise specified, all percentages are by weight.

EXAMPLE 1

A gel stock cellulosic sausage casing was treated with an aqueous solution of ten liters of distilled water containing:

| | Weight percent |
|---|---|
| Ascorbic acid | 0.3 |
| Citric acid | 0.5 |
| Glycerine | 14.0 |

After drying, the casing had a flat width of 1.31 inches, a single wall thickness of about 1.04 mils and was found to contain approximately 0.5% by weight ascorbic acid. The dried shirred casing was then stuffed with a raw frankfurter emulsion, the surface of which in contact with the inner wall of the casing turned a red meat color immediately after stuffing. Some of the thusly stuffed casings were smoked for a period of 1.5 hours and the remainder for a period of 4.5 hours. A red cured meat color was further developed and retained in the stuffed casings after smoking and showering for 1.5 hours in the conventional manner. No additional red cured meat color developed in the stuffed casings similarly processed for 4.5 hours. The casings were removed from both batches and the frankfurters stored at 40° F. for several days. The desirable red cured meat color remained unchanged on the surface of the frankfurters during this period.

EXAMPLE 2

A gel stock cellulosic sausage casing having, after drying, a dry flat width of about 1.31 inches and a single wall thickness of about 1.04 mils was treated with an aqueous solution of ten liters of distilled water containing:

| | Weight percent |
|---|---|
| Ascorbic acid | 0.50 |
| Citric acid | 0.5 |
| Glycerine | 12.0 |

The casing treated with this solution was found, after drying, to contain approximately 0.09% by weight ascorbic acid. The dried casing was then stuffed with a raw frankfurter emulsion and the surface of the raw meat emulsion in contact with the inner wall of the casing turned bright pink immediately after stuffing. A red cured meat color further developed after smoking and showering. The casing was removed from the thusly processed frankfurters and the frankfurters stored at 40° F. for several days. The color remained unchanged on the surface of the frankfurters during this period.

EXAMPLE 3

A gel stock cellulosic sausage casing having, after drying, a dry flat width of about 1.31 inches and a single wall thickness of about 1.04 mils was treated with a solution of ten liters of distilled water containing:

| | Weight percent |
|---|---|
| Sodium ascorbate | 0.15 |
| Sodium citrate | 1.5 |
| Glycerine | 12.0 |

The dried casing treated with this composition was found to contain an amount of retained sodium ascorbate equivalent to approximately 0.11% by weight as absorbic acid. A raw frankfurter emulsion was stuffed into the dried casing and the surface of the meat emulsion in contact with the inner wall of the casing developed a bright pink surface color immediately after stuffing. A red cured meat color was further developed on the surface of the thusly encased meat emulsion after smoking and showering. The casing was then removed. The color was unchanged on the surface of the thusly processed meat emulsion after several days' storage at 40° F.

Control

Cellulosic casings, having a flat width of about 1.31 inches and a single wall thickness of about 1.04 mils, were used without treatment with edible reducing agent compositions. These casings were used as controls and were stuffed with a raw meat emulsion in the same manner as Examples 1, 2 and 3. A red meat color did not develop immediately after stuffing with a frankfurter emulsion as in Examples 1 to 3. Moreover, as shown in the table set forth below, the surface of the emulsion in contact with the inner wall of the control casing and processed in the control casing did not develop an acceptable pink color until after it had been smoked for 4.5 hours.

sired red cured meat color is developed in a shorter time resulting in increased productivity. Additionally, the short smoke method is also more economical as compared to the long smoke method which is usually resorted to in order to obtain adequate surface color in meat emulsions processed in untreated casing.

EXAMPLE 4

Aluminum smoke sticks were dipped in a 0.2% copper sulfate solution. The solution was allowed to drain from the smoke sticks and the smoke sticks were dried prior to use. A raw commercial frankfurter meat emulsion was stuffed into the casing of Example 1 (casing treated with an ascorbic acid solution). The encased raw frankfurter emulsion were smoked while suspended on the aluminum smoke sticks which had been dipped into the aqueous copper sulfate solution. The cooked, cured frankfurter emulsions were thereafter removed from the smokehouse, the casing removed therefrom and the thusly processed frankfurters were stored overnight at 40° F. No green discoloration occurred on the cooked cured frankfurter emulsions at their points of contact with the smoke sticks. Frankfurter emulsions similarly processed in the control casings; that is, those not treated with the ascorbic acid composition, exhibited green discoloration at their points of contact with the smoke sticks.

In tests conducted on the efficiency of an edible stabilizer for use in this invention cellulosic casings were impregnated by immersion in an aqueous bath comprising 12 weight percent glycerine, 3 weight percent citric acid and 0.3 weight percent ascorbic acid. Two lengths of cellulose casings were soaked in this bath, dried, humidified to 15 weight percent water content and stored for 6 months. By analysis, both casings contained 0.53 weight percent ascorbic acid immediately after humidification. One casing was shirred prior to humidification and the other humidified in the unshirred state. After storage at 40° F. for 3 weeks, 3 months and 6 months, respectively, the shirred casings were analyzed for ascorbic acid content. Values of 0.42 weight percent, 0.46 weight percent and 0.44 weight percent ascorbic acid by weight of the shirred casings were respectively found. The unshirred casing similarly stored was also analyzed at the same time intervals and showed an ascorbic acid content of 0.25 weight percent after 3 weeks, 0.22 weight percent after

TABLE I

| Example No. | Treating Agent Used | Desired Color Produced Immed. After Stuffing | Total Time In Smoke-House (Long Smoke) (hrs.) | Surface Color After Long Smoke | Total Time In Smoke-House (Short Smoke) (hrs.) | Surface Color After Short Smoke | Internal Temp. Of Frankfurter At End of Smoke (° F.) |
|---|---|---|---|---|---|---|---|
| 1 | Ascorbic Acid | Very good | 4.5 | Red | 1.5 | Red | 137 |
| 2 | do | Good | 4.5 | Bright Pink | 1.5 | Bright pink | 137 |
| 3 | Sodium Ascorbate | do | 4.5 | do | 1.5 | do | 137 |
| Control | None | None | 4.5 | Pink | 1.5 | Very Faint Pink | 137 |

As can be seen by the data set forth in Table I, frankfurter emulsions processed in the casings treated with the reducing agent of this invention by either the short smoke method (about 1.5 hours) or the long smoke method (about 4.5 hours) exhibited the desirable red cured meat surface color formation. The red cured meat color formation in the control casing was poor in comparison to that in the treated casings and required a substantially longer period to develop.

Furthermore, in the short smoke method, the desired red cured meat surface color readily developed in the casings treated with the edible reducing agents of the present invention while the color developed in the control casing during this same period was negligible.

Processing raw meat emulsions encased in cellulosic casings treated with an edible reducing agent by the short smoke method is significantly advantageous since the de- 3 months, and 0.27 weight percent after 6 months, all percents being based upon the weight of the dried casing. It should be noted that the slight deviations found in ascorbic acid content are well within the range of the test reproducibility.

Shirring of the treated casing reduces its exposed surface area to a small fraction of the original surface area inasmuch as present day shirring operations are capable of producing, from a 50 foot length of casing, a shirred tubular stick of casing of the order of 10 inches or less in length. Evidently such reduced exposed casing surface area effectively minimizes loss of the ascorbic acid in the casing due to oxidation, volatilization or other losses and, hence, it is preferred to shirr the casings after treatment with ascorbic acid or equivalent edible reducing agents.

While the invention has been described with particularity and in some detail, it should be understood that the same is susceptible of variation, modification and alteration without departing from the scope and spirit of the invention.

What is claimed is:
1. In the art of preparing a cooked, cured meat product which comprises preparing a raw meat emulsion; stuffing such emulsion in a synthetic food casing; cooking and curing the meat emulsion in said casing and maintaining said stuffed casing and contained emulsion under cooking and curing conditions until a red, cured meat color is developed at least on the surfaces of said meat emulsion in contact with said casing, the improvement which comprises stuffing said raw meat emulsion in a synthetic food casing having in at least its interior walls an edible reducing agent selected from the group consisting of 1-ascorbic acid, isoascorbic acid, the edible metal salts of 1-ascorbic acid and isoascorbic acid, the esters of 1-ascorbic acid and isoascorbic acid and mixtures of said acids, said edible metal salts of said acids and said esters of said acids, said reducing agent being present in said casing wall in a quantity sufficient to impart immediately a red meat color to the surfaces of said meat emulsion in contact with said inner wall of said casing upon stuffing said emulsion therein; and then cooking and curing said emulsion in said casing so that a cooked, cured meat product is obtained which exhibits a desired red, cured meat color substantially contemporaneously within the time period required to cook and cure said emulsion without requiring said casing and contained emulsion to be maintained under cooking and curing conditions beyond said cooking and curing time solely for the development of said desired red, cured meat color on the surfaces of said meat emulsion in contact with said casing.

2. The method of claim 1 wherein the edible reducing agent is present on the inner wall of said synthetic food casing in an amount of at least 0.05% by weight based upon the weight of the dried synthetic food casing.

3. The method of claim 1 wherein the raw meat emulsion is a raw frankfurter emulsion and the red cured meat color is developed by cooking and curing the thusly encased raw frankfurter emulsion for a period of about 1.5 hours.

4. The method of claim 2 wherein the edible reducing agent is present on the inner wall of said dried synthetic food casing in an amount of between about 0.08% to 1.0% by weight.

5. The method of claim 2 wherein an edible stabilizer is present on the inner wall of said dried synthetic food casing in an amount of up to about 10 times the amount of said edible reducing agent.

6. The method of claim 5 wherein said edible stabilizer is selected from the group consisting of saturated aliphatic hydroxy acids and edible salts of said saturated aliphatic hydroxy acids.

References Cited

UNITED STATES PATENTS

| | | | |
|---|---|---|---|
| 2,521,101 | 9/1950 | Thor et al. | 99—176 |
| 2,553,533 | 5/1951 | Komarik et al. | 99—159 |
| 2,979,410 | 4/1961 | Parlour | 99—171 |
| 3,052,553 | 9/1962 | McKillip et al. | 99—171 |

LIONEL M. SHAPIRO, *Primary Examiner.*

A. LOUIS MONACELL, *Examiner.*